Oct. 26, 1926.
W. M. DOSBAUGH
HEADLIGHT CONTROLLING APPARATUS
Filed Nov. 30, 1923
1,604,265
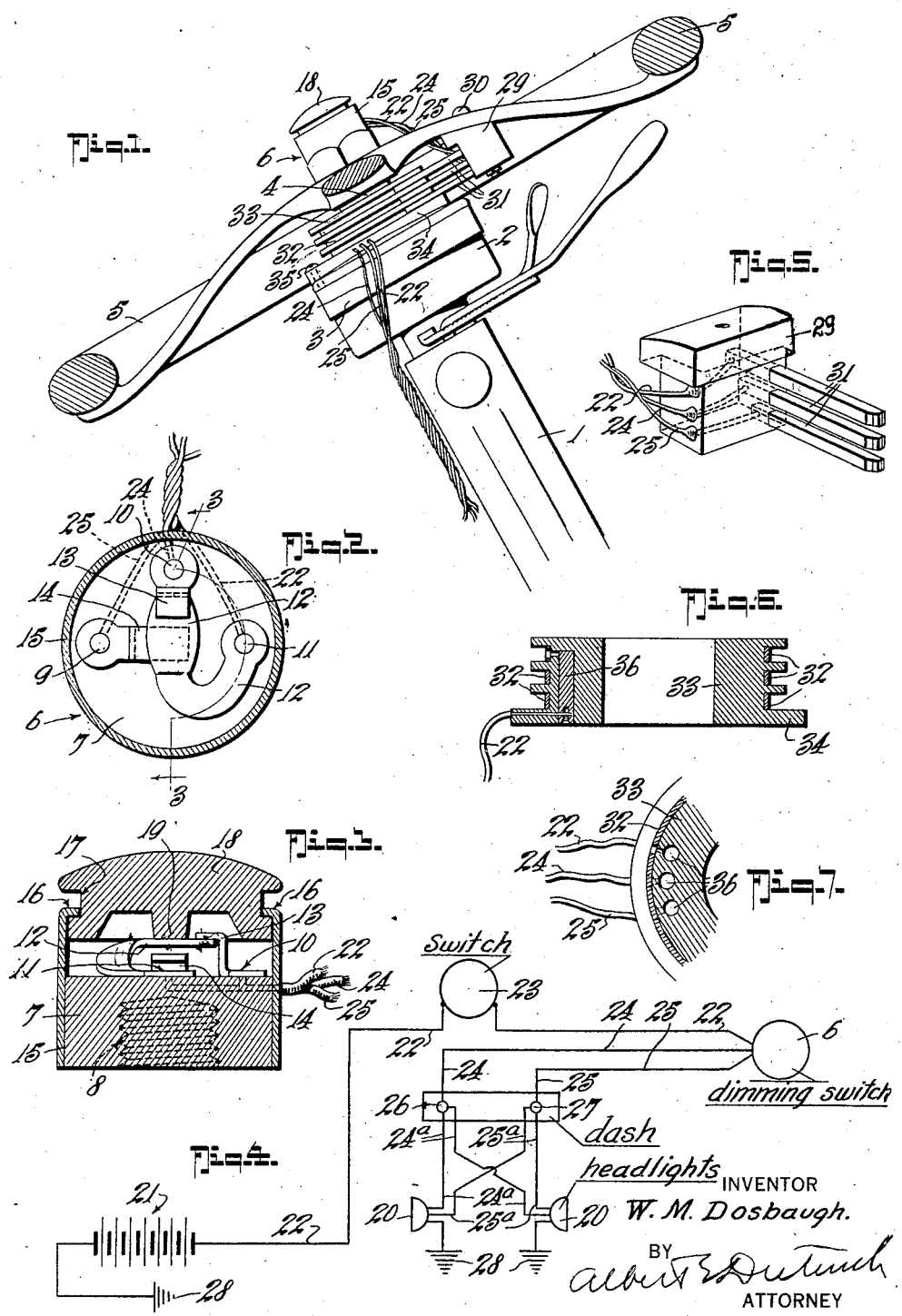

Patented Oct. 26, 1926.

1,604,265

UNITED STATES PATENT OFFICE.

WILLIAM M. DOSBAUGH, OF CEDAR VALE, KANSAS.

HEADLIGHT-CONTROLLING APPARATUS.

Application filed November 30, 1923. Serial No. 677,923.

The invention relates to apparatus whereby the headlights of an automobile may be readily changed from a bright light effecting condition to a dim light effecting condition at the will of the operator of the automobile.

Many States having in force legislation requiring the dimming of bright headlights as a safety measure in favor of passing motorists, it is practical to equip automobiles with apparatus whereby the driver may quickly and conveniently effect a control of the lighting circuit whereby to dim his headlights while passing an approaching motorist. In the apparatus usually developed in an effort to supply this need of the industry the detail arrangements are usually such that complicated switches are made necessary and which must be arranged in a manner whereby the motorist is put to considerable inconvenience in the effecting of the functions for which such apparatus were designed.

Therefore, it is the object of my present invention to provide a headlight controlling apparatus in which the constituent parts are so constructed and cooperatively arranged as to be very inexpensive of construction, capable of application by the lay owner upon his Ford automobile, and which, when applied, is positioned and equipped for effecting the desired dimming of the headlights when passing an oncoming motorist and for returning the control to the bright light effecting condition in a quick and effective manner, and without inconvenience to the motorist or interference with perfect steering control.

With the above and other objects in view, the invention further resides in those novel details of construction, combination and arrangement of parts, all of which will be first fully described, then be particularly pointed out in the appended claim, reference being had to the drawing by which it is accompanied, in which:

Figure 1 is a detail side view, parts being in section, of the steering head of a Ford car with my invention operatively mounted thereupon.

Figure 2 is a horizontal section of the dimming switch.

Figure 3 is a vertical cross section thereof taken on the line 3—3 on Figure 2.

Figure 4 is a diagram illustrating an application of my invention.

Figure 5 is a perspective view of the contact making plug.

Figure 6 is a vertical cross section of the contact member.

Figure 7 is a fragmentary horizontal section of the contact member.

In the drawing, in which like numerals of reference indicate like parts in all of the figures, 1 represents the steering post casing of the well-known Ford car upon which is mounted the usual internal gear casing 2 closed by the gear case cover 3 and through which projects the steering post 4 upon which the steering wheel 5 is mounted, all of which are conventional in the type of automobile mentioned.

The dimmer switch member is mounted upon the threaded upper end of the steering post 4, the said switch member including a body core preferably of some electrically nonconductive material and which includes a centrally threaded tap 8 for conveniently mounting the same upon the said steering post, as before stated. The core body 7 is provided with three electric terminals, one 9 thereof providing a dim light effecting connection, one 10 thereof for providing a bright light effecting connection and the remaining one 11 thereof effecting a connection with the battery or source of energy in the manner later to be referred to.

Each of these terminals have cooperation with the contact members, one 12 thereof cooperating with the terminal 11 and hereinafter termed "the battery contact", one 13 thereof cooperating with the terminal 10 and hereinafter termed "the bright lights contact" and one 14 thereof cooperating with the terminal 9 and hereinafter termed "the dim lights contact."

A casing 15 is provided for enclosing the body core 7 and the casing projects a considerable distance upward from the top of that core to form a chamber above that core, as will be apparent from Figures 2 and 3 of the drawing. The upper end of the casing 15 is inturned to form an annular flange 16 for cooperating with the annular groove 17 formed in the push button 18 which has its under face cored out to provide a central contact engaging head 19 (see Figure 3).

By reference to Figures 2 and 3 of the drawings, it will be seen that the construction and arrangement of the contacts 12, 13, 14, is such that the battery contact 12 is, by reason of its spring action, held in normal contact with the under face of the overhang portion of the "bright lights contact" 13 and therefore normally effecting a lighting of the bright lights of the automobile in a manner later to be described.

The spring action of the contact 12 also serves to hold the press button 18 to its outermost limit, as indicated in Figure 3. It will also be observed that the "dim lights contact" 14 has its contact making portion positioned centrally of the casing 15 and just beneath but normally out of contact with the battery contact 12 so that when pressure is applied to the push button 18, the contact member 12 may be forced out of engagement with the "bright lights contact" 13 and into cooperative engagement with the "dim lights contact" 14 to effect a temporary dimming of the headlights of the automobile, in the manner later to be described.

In Figure 4 of the drawing is illustrated diagrammatically one conventional method of wiring my apparatus to effect its function. In this figure, the dimming switch is indicated at 6, the headlights are designated 20, the battery 21 and the circuit wire from the battery to the dimmer switch as 22. The usual cutoff switch 23 may be spliced into this circuit wire 22 for cutting off the lighting system from the source of energy when desired.

The "bright lights contact" 13 of the dimmer switch 6 is connected directly with the "bright lights terminal" 26 on the dash, from which terminal the circuit continues through the split connection 24ª—24ª one wire going to each headlight 20, as shown, and the "dim lights contact" 14 is connected directly with the dim lights terminal 27 on the dash, from which terminal the circuit continues through the split connection 25ª—25ª, one wire thereof also going to each headlight 20. Each headlight 20 and the battery 21 are suitably grounded as indicated at 28, the various connections below the dash being now common to the Ford machine.

By reason of the fact that the dimmer switch 6 is mounted as it is upon the steering post 4, I desire to provide a movable contact making means whereby flexure of the wire connections between the said switch and the lighting circuit may be prevented. For this purpose, I provide a contact making plug 29 which is secured to a convenient one of the spokes of the steering wheel 5 through the medium of the bolt connection 30 and which includes three contact making brush fingers 31 projecting therefrom and which are in communication with the wires 22, 24, 25 from the dimmer switch 6 (see Figure 5). These contact fingers are adapted to cooperate with the contact rings 32 of a contact member 33 preferably constructed of some electrically non-conductive material, the base portion 34 thereof being adapted to rest upon the internal gear case cover 3 and be held thereto by the screw 35 for preventing displacement thereof by rotation upon the steering post 4, see Figures 1 and 6. By reference to Figure 6, it will be noticed that the member 33 is centrally apertured to fit over the said steering post 4. Each of the contact rings 32 is individually electrically connected with its respective binding post 36 embedded therein and arranged as is indicated in Figures 6 and 7 and to which posts are secured the continuations of the wires 22, 24 and 25.

From the foregoing, it will be observed that the dimmer switch and the contact making plug 29 and the wires 22, 24 connecting the two, all move together with the steering wheel when it is moved, thereby obviating all flexure of the wires passing therebetween. It will also be observed that the contact member 33 is stationary, being secured upon the top of the cap 3 and therefore the continuation of the wire connections 22—24—25 therebetween and with the headlights and source of energy are also held against possible flexure. The fingers 31 and rings 32 effect the proper electrical energy conduction while permitting the necessary movement between those two parts.

By reason of all of the foregoing, it will be observed that when the switch 23 is set to permit electric energy to pass therethrough, and the press button 18 is in the position illustrated in Figure 3, energy will flow from the battery, through the wire 22, switch 23 and wire continuation 22 to the contact 12 within the dimming switch 6 and from the contact 12 through the "bright lights contact" 13, through the wire connection 24 to and through the "bright lights terminal" 26 on the dash, through the split circuit 24ª—24ª, and through the headlights 20, thus effecting lighting of the bright lights, the circuit being completed through the ground connections 28.

I have just described the normal operative condition of my apparatus, normal because the use of the bright lights is much more common than the use of the dim lights, especially on road travel where the lights are dimmed only on passing an oncoming motorist, it therefore being desired to dim the lights only momentarily.

In effecting the disconnection of the bright lights effecting circuit and the connection of the dim light effecting circuit, the button 18 being pressed, the electric energy from the battery 21 will be caused to flow through the wire connection 22, switch 23 and wire continuation 22 to the battery contact 12 within the dimming switch 6. The battery contact 12 being now forced downward into operative engagement with the dim lights contact 14, the electric energy will flow from the "dim lights contact" 14, wire connection 24, "dim lights terminal" 27, split circuit 25ª—25ª, and through the headlights 20, thus effecting a dim lighting thereof in the usual manner, the circuit being completed through the ground connections 28—28, as before.

By reason of the use of the movable contact making elements 29—33 and the mounting of the dimming switch upon the steering post of the automobile, the control of the lights is placed at a point where it may be most conveniently actuated without a change of position of the motorist desiring to dim his lights and without any interference whatever with the steering operation.

From the foregoing description, taken in connection with the accompanying drawing, it is thought the complete construction, operation and advantages of my invention will be readily understood by those skilled in the art.

What I claim is:

A control switch for electric circuits comprising a plug of insulation threaded to fit onto the upper end of the steering column of an automobile, a cylindrical shell within one end of which said plug is mounted, the other end of the shell being turned inwardly to form a flange, a push button of insulation having an annular groove fitted within the flanged end of the shell with the flange located in the groove, said push button having a projection on its under-surface, a leaf-spring contact member secured on said plug within the shell and projecting under said push button projection to be engaged by it, two fixed contacts on said plug within the shell, one of which projects under a portion of said spring contact that is beneath the push button projection, the other of which has a portion extending above the free end of said spring contact to one side of said push button projection, all being arranged whereby said spring contact will normally tend to elevate the push button and remain in contact with one of said fixed contacts substantially as specified.

WILLIAM M. DOSBAUGH.